US009326912B2

(12) United States Patent
Nicholson

(10) Patent No.: US 9,326,912 B2
(45) Date of Patent: May 3, 2016

(54) DOCKABLE REMOTE CONTROL FOR PORTABLE SPAS

(71) Applicant: Larry Nicholson, Fallbrook, CA (US)

(72) Inventor: Larry Nicholson, Fallbrook, CA (US)

(73) Assignee: WATKINS MANUFACTURING CORPORATION, Vista, CA (US)

( * ) Notice: Subject to any disclaimer, the term of this patent is extended or adjusted under 35 U.S.C. 154(b) by 210 days.

(21) Appl. No.: 14/262,597

(22) Filed: Apr. 25, 2014

(65) Prior Publication Data

US 2015/0196456 A1 Jul. 16, 2015

Related U.S. Application Data

(60) Provisional application No. 61/927,090, filed on Jan. 14, 2014.

(51) Int. Cl.
*A61H 33/00* (2006.01)
*G02F 1/1333* (2006.01)

(52) U.S. Cl.
CPC ........ *A61H 33/005* (2013.01); *G02F 1/133308* (2013.01); *A61H 2201/0111* (2013.01); *A61H 2201/0115* (2013.01); *A61H 2201/5007* (2013.01); *A61H 2201/5046* (2013.01); *G02F 1/13338* (2013.01); *G02F 2001/133311* (2013.01)

(58) Field of Classification Search
CPC ................................ G06F 3/041–3/048; G06F 2203/041–2203/04809; G02F 1/13338
See application file for complete search history.

(56) References Cited

U.S. PATENT DOCUMENTS

| 5,219,067 | A | 6/1993 | Lima et al. |
| 5,713,466 | A | 2/1998 | Tajima |
| 6,646,864 | B2 | 11/2003 | Richardson |
| 6,871,138 | B1 | 3/2005 | Minelli |
| 7,149,558 | B2 | 12/2006 | Kakuguchi et al. |
| 7,205,900 | B2 | 4/2007 | Liu et al. |
| 7,230,823 | B2 | 6/2007 | Richardson et al. |
| 7,383,150 | B2 | 6/2008 | Angelini et al. |
| 8,040,667 | B2 | 10/2011 | Yang |
| 8,081,267 | B2 | 12/2011 | Moscovitch et al. |
| 8,102,483 | B2 | 1/2012 | Perry et al. |
| 8,160,657 | B2 | 4/2012 | Perriello et al. |
| 8,244,320 | B2 | 8/2012 | Lee et al. |
| 8,294,843 | B2 | 10/2012 | Hollaway |

(Continued)

FOREIGN PATENT DOCUMENTS

JP 03-098855 U 10/1991
JP 2012-1785454 A 9/2012

OTHER PUBLICATIONS

PCT International Search Report for PCT/US2014/047057 dated Jan. 14, 2014, 3 pages; PCT Written Opinion of the International Searching Authority for PCT/US2014/047057 dated Jan. 14, 2014, 5 pages.

*Primary Examiner* — Priyank Shah
(74) *Attorney, Agent, or Firm* — Lappe Ubell IP Law, LLP; Franklin Ubell

(57) ABSTRACT

A waterproof, floatable and dockable remote control for controlling portable spa functions comprising a waterproof touch screen display and a sealed battery housing containing a battery rechargeable by wireless power transfer wherein the remote communicates over a wireless link with a spa-based controller and employs a graphic display system designed to maintain graphics responsiveness while extending battery life.

16 Claims, 13 Drawing Sheets

(56) References Cited

U.S. PATENT DOCUMENTS

| | | |
|---|---|---|
| 8,342,325 B2 | 1/2013 | Rayner |
| 8,344,277 B1 | 1/2013 | Bloch |
| 8,350,984 B2 | 1/2013 | Perry et al. |
| 8,395,894 B2 | 3/2013 | Richardson |
| 8,399,764 B2 | 3/2013 | Klosky |
| 8,453,835 B2 | 6/2013 | So |
| 2008/0129578 A1 | 6/2008 | Petersen et al. |
| 2012/0229424 A1 | 9/2012 | Behles et al. |
| 2013/0206660 A1* | 8/2013 | Hui .............. E04H 4/1281 210/167.11 |

\* cited by examiner

DOCKABLE REMOTE CONTROL FOR PORTABLE SPAS

CROSS REFERENCE TO RELATED APPLICATIONS

This application claims the benefit of and priority to U.S. Provisional Application Ser. No. 61/927,090, filed Jan. 14, 2014, entitled "Dockable Remote Control For Portable Spas," the contents of which is hereby incorporated herein by reference herein in its entirety.

BACKGROUND OF THE INVENTION

Field of Invention

The subject disclosure relates to spas, tubs, and the like and more particularly to a dockable remote control for enabling a spa user to remotely control various spa functions.

SUMMARY

The following is a summary of description of illustrative embodiments of a new spa remote control. It is provided as a preface to assist those skilled in the art to more rapidly assimilate the detailed design discussion which ensues and is not intended in any way to limit the scope of the claims which are appended hereto in order to particularly point out the invention.

According to one illustrative embodiment, a waterproof floatable remote control is provided having a top housing comprising a first upper step leading to a second lower step. A first adhesive layer located about the perimeter of an underside of a top polyester layer attaches the top polyester layer to a tread portion of the first upper step. A clear polycarbonate layer has a sidewall which lies adjacent a riser portion of the first upper step. A resistive touch screen structure is located on a top surface of the clear polycarbonate layer and has an upper conductive layer located on a backside of the top polyester layer and spaced apart from a lower conductive layer located on a top surface of the clear polycarbonate layer. A perimeter adhesive is formed around a perimeter of the touch screen structure and bonds the backside of the top polyester layer to the top surface of the clear polycarbonate layer, while a second adhesive layer fastens a bottom surface of the polycarbonate layer to a tread portion of the second lower step. An LCD module is positioned adjacent a riser portion of the second lower step and is adhered to the back of the polycarbonate layer by a clear optical bonding adhesive.

In the illustrative structure, the first adhesive layer on the underside of the top polyester layer forms a primary water proof seal. The top polyester layer has a width greater than that of a width of the touch screen structure thereby preventing the touch screen structure from being exposed to water. Additionally, the second layer of adhesive provides mechanical support for both the polyester layer and the LCD module.

The remote control of the illustrative embodiment may further comprise a bottom housing configured to mate with and attach to the top housing and having a receptacle therein, which receives and mounts a battery assembly. The battery assembly may include a rectangular housing, a rechargeable battery, and a power receiving coil mounted in the housing beneath the battery for charging the battery. In one embodiment, the rectangular housing may comprise a bottom part mating with a top part, and a watertight gland seal between the top and bottom parts. In one embodiment, the battery assembly and the power receiving coil are centered within the bottom housing to promote even floating of the remote control.

According to an illustrative embodiment, a remote control may further comprise a graphics display system comprising a screen configuration table memory, a graphics memory, an SDRAM, and graphics electronics configured to control an image displayed on a display screen. In one embodiment, the system is configured to preload screens from the graphics memory to SDRAM upon system power-up and to respond to a first command from a spa controller to draw a first new screen by sending image data from a memory buffer portion of the SDRAM to the graphics electronics to cause display of the image represented by the image data. The system may further be configured to respond to commands from the spa controller to update the first new screen image by constructing a new update image in a dynamic buffer portion of SDRAM, and instantaneously causing display of the new image in place of the image originally presented from the SDRAM memory buffer. In one embodiment, the system is further configured to update the configuration table memory to reflect the new image being displayed.

DETAILED DESCRIPTION

Figure 1:
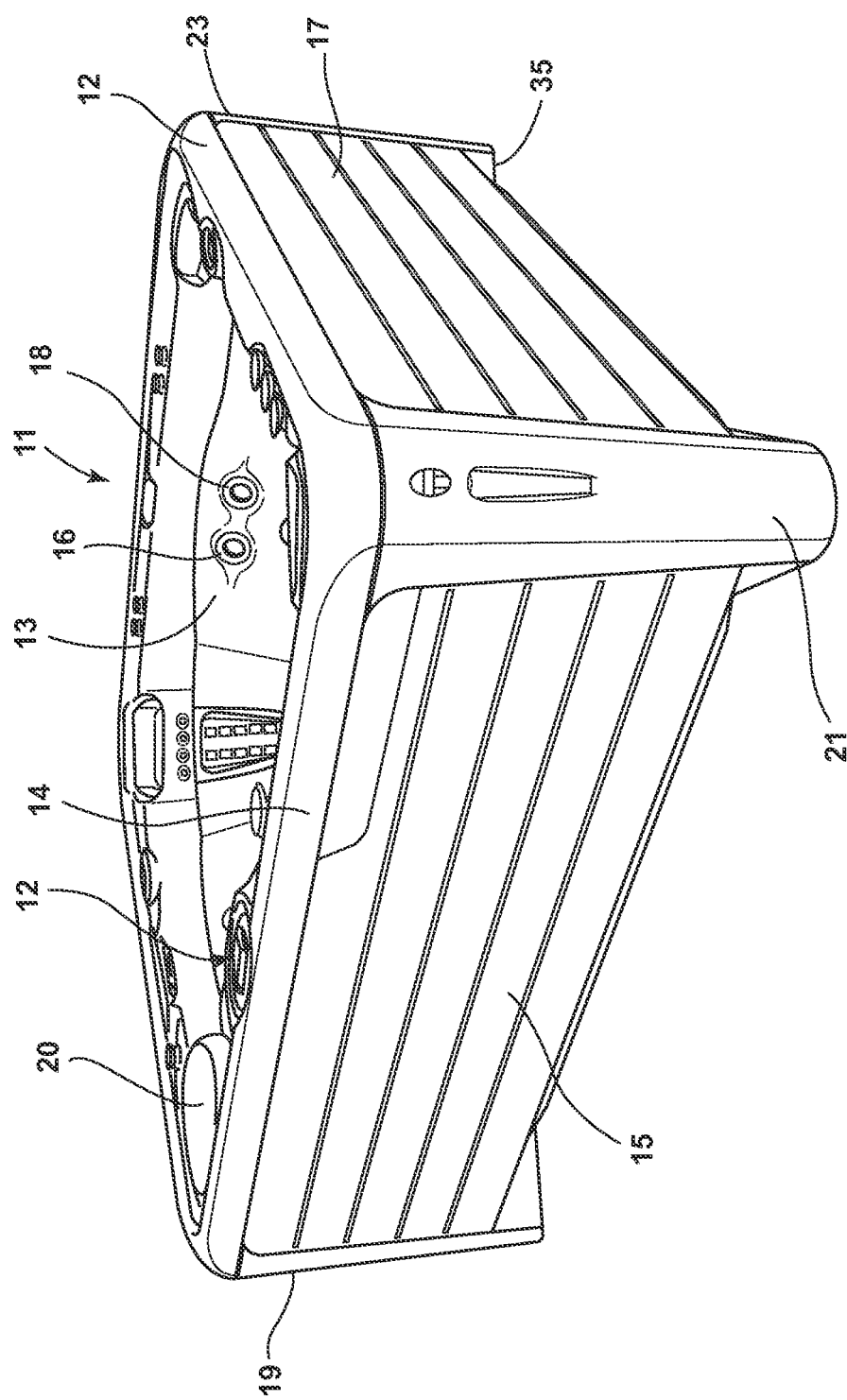
FIG. 1 is a perspective view of an illustrative portable spa.

FIG. 1 illustrates a portable spa 11 having a spa shell 13, side panels 15, 17 and corner pieces 19, 21, 23. The spa shell 11 has a generally rectangular rim 14 about its upper periphery and includes various features such as jets, e.g. 16, 18, a filter compartment 20 and a remote control system 12.

Figure 2:
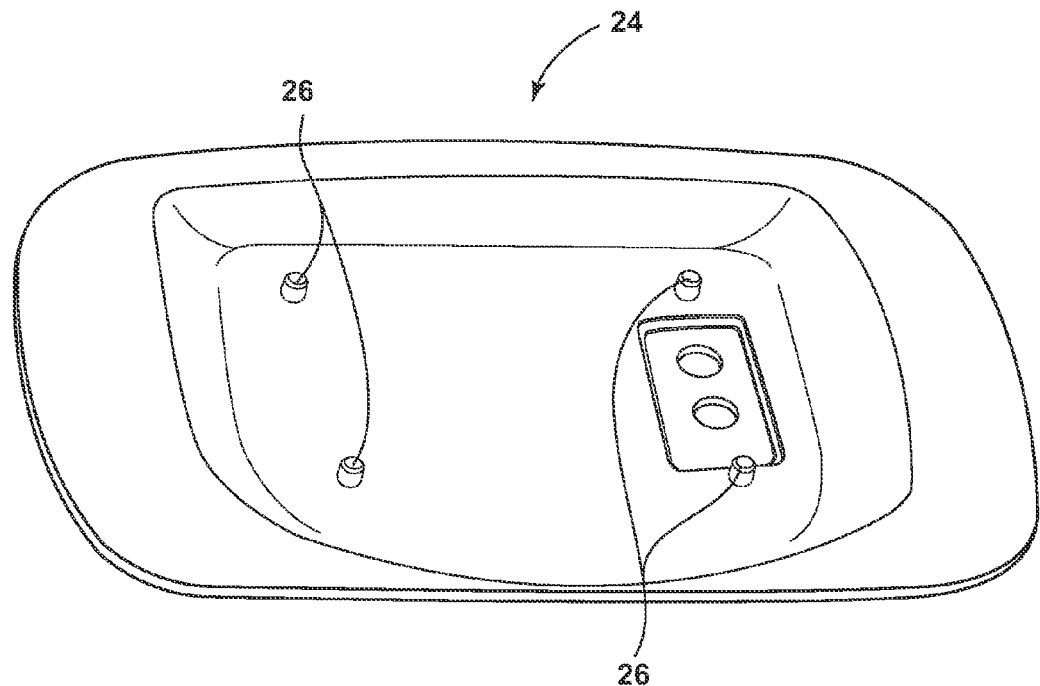
FIG. 2 is a perspective view of a remote control docking station according to an illustrative embodiment.
Figure 3:
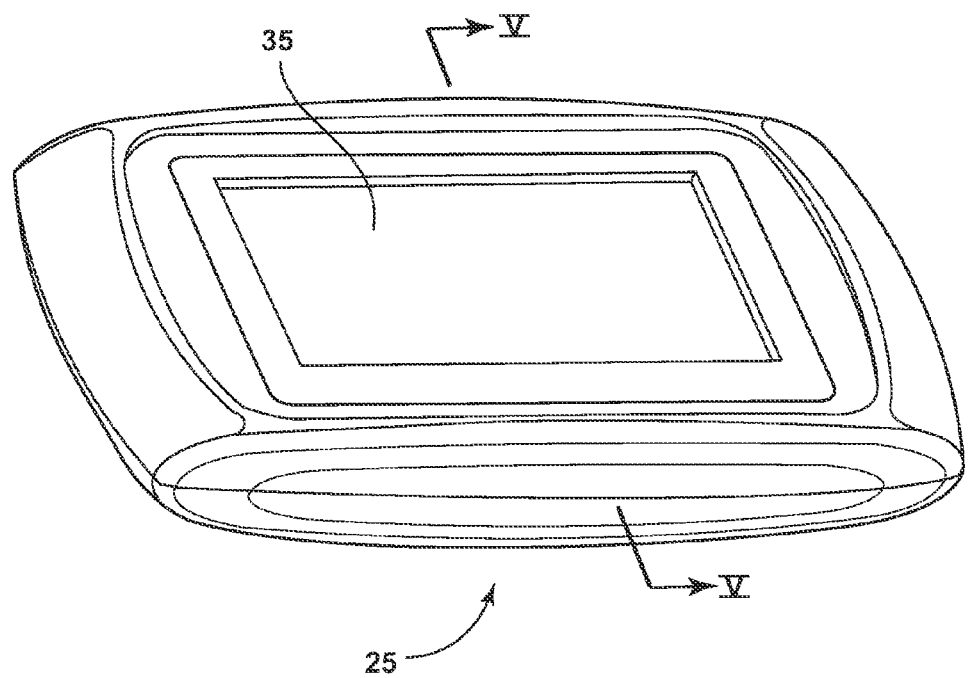
FIG. 3 is a perspective view of a remote control according to an illustrative embodiment.

The remote control system 12 provides a wireless remote control for portable spas and includes a dock 24 (FIG. 2) and a remote control 25 (FIG. 3). The dock 24 is mounted into the spa 11 in a user-convenient location and is used to dock the remote 25 when not in use and to charge a battery in the remote 25. The remote 25 can be removed from the dock 24 at any time and used either while in the dock 24 or at any location within the vicinity of the spa 11. The remote 25 provides fingertip control of jets, lights, music, and other spa functions while relaxing in the spa 11 without requiring the user to change position. The remote 25 of the illustrative embodiment is completely waterproof and floatable and will operate while floating in the spa water.

The dock 24 comprises a communications interface to a central spa controller within the spa 11, a radio for communication with the remote, a wireless power transmitter, and a WiFi module for communication to nearby WiFi devices, such as a smart phone. The docking station 24 includes four pegs 26, which mate with corresponding holes on the back side of the remote 25. The holes and pegs are positioned such that the remote 25 may be oriented in a first position where the display 27 can be read by someone in the spa 11 or in a second position where it can be read by someone outside the spa 11.

In one illustrative embodiment, the remote 25 may comprise a touch screen structure 35 specifically designed for a wet environment, a radio for communication with the dock 24, a battery (FIG. 8) with associated battery management systems, a wireless power receiver, a USB programming input, and a configurable graphic system that allows for flexibility in spa control updates, yet still maintains graphics responsiveness and extended battery life.

The construction of an illustrative embodiment of the remote control 25 is illustrated in FIGS. 4-8. As shown in the assembly view of FIG. 4, the remote 25 has a concentrically layered structure including a polyester layer 31, an adhesive layer 33, a touch screen structure 35, a touch screen adhesive ring 37, an optical adhesive layer 39, an LCD (liquid crystal display) 41, a polyester bead seal 43, a top housing 45, a main seal 47, a PCB (printed circuit board) assembly 49, a bottom housing 51, and a battery pack assembly 53. Additional componentry includes a light pipe 55, a pressure vent 57, a test plug 59 and an FCC label 61.

In the illustrative embodiment, the top polyester layer 31 is used to provide a flexible touch layer and for waterproofing. The layer 31 extends out beyond all other layers for bonding as described below. In one embodiment, the back of the polyester layer 31 may be printed with various screen-print inks/graphics around the perimeter of the touch area.

The adhesive seal layer 33 bonds the bottom side of top polyester layer 31 around the perimeter of the plastic housing 45 to the tread (horizontal) portion of a first step 32 (FIG. 6) of the remote control body. This bond and seal prevents water from reaching the inner touch screen structure 35 or its adhesives. The adhesive seal layer 33 is water proof and chemical resistant, and in one embodiment may comprise 3M VHB™ double sided tape. An optional application of water repellent material, such as a hydrophobic nano-coating, may be made to the outer edge 34 (FIG. 6) of the adhesive 33 to provide additional protection.

Figure 7:
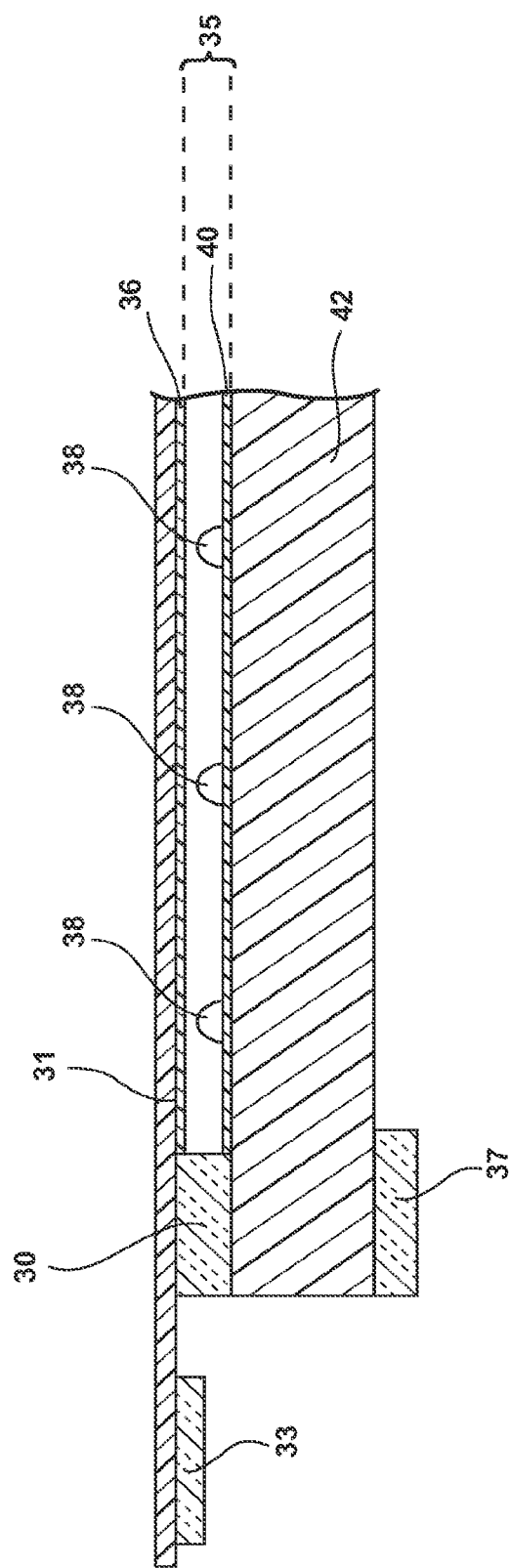
FIG. 7 is a fragmentary side sectional view illustrative of touch sensing structure employed in the remote control of FIG. 3.

FIG. 7 illustrates a touch sensing structure 35 comprising a clear electrically conductive layer 36 applied to the bottom side of the top polyester layer 31 and a clear electrically conductive layer 40 applied to the top of a polycarbonate substrate layer 42. A plurality of spacer dots 38 define a space which separates the conductive layers 36, 40. An adhesive bond is made around the perimeter of the touch screen area by adhesive 30 in order to bond the bottom of the top polyester layer 31 to the top of the polycarbonate substrate layer 42, while holding the spacer layer in place.

In an illustrative embodiment, the touch screen is a 4-wire resistive touch screen where the conductive layers 36, 40 may be, for example, ITO (indium tin oxide). When a person touches the polyester layer 31, it deflects, causing the two ITO layers 36, 40 to make an electrical connection. Since the ITO layers 36, 40 are electrically resistive, the position of the touch can be determined by a resistance reading taken for both X and Y coordinates, as known to those skilled in the art.

Figure 5:
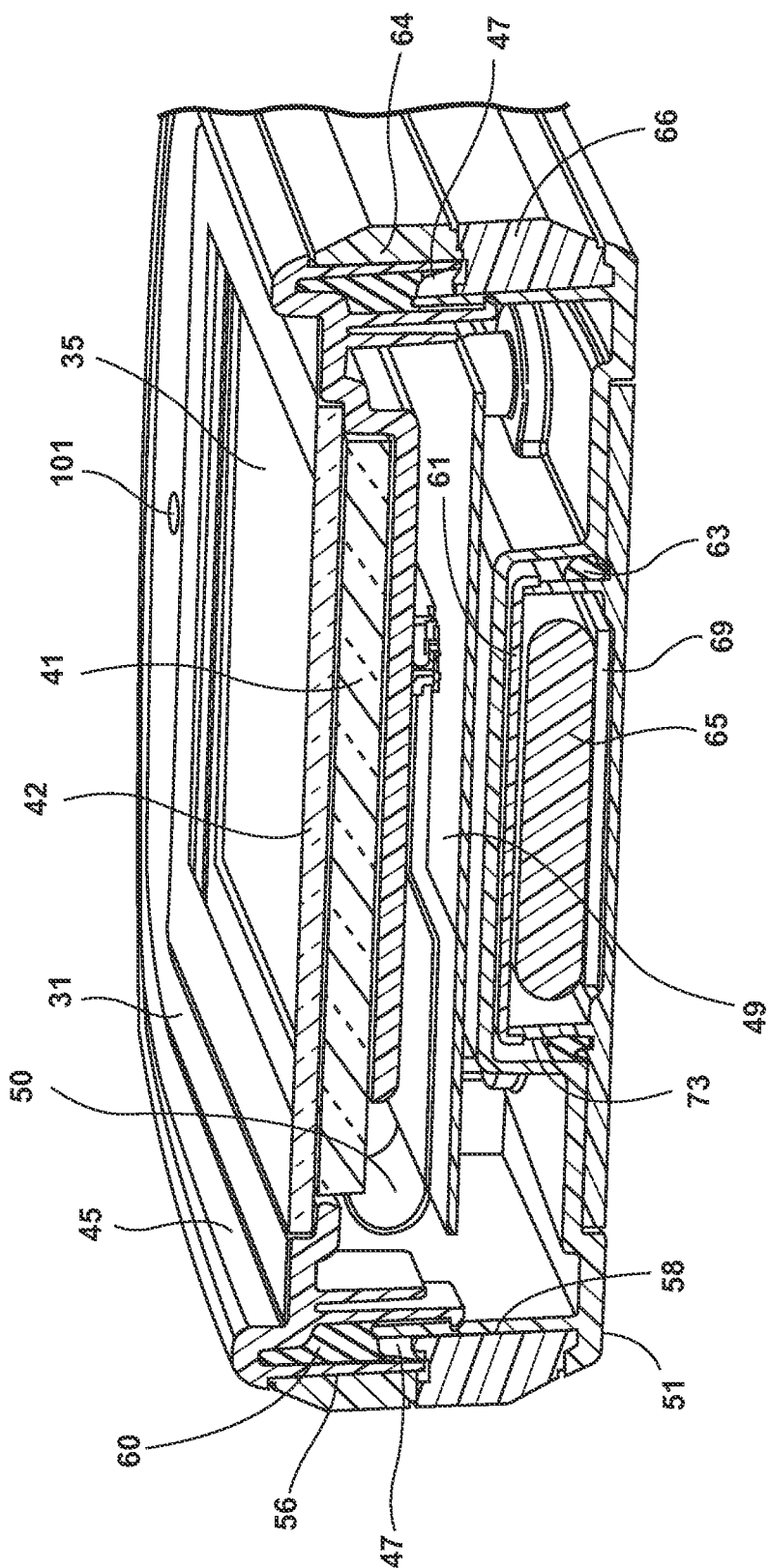
FIG. 5 is a cross-sectional view of the illustrative remote control taken at V-V of FIG. 3.
Figure 6:
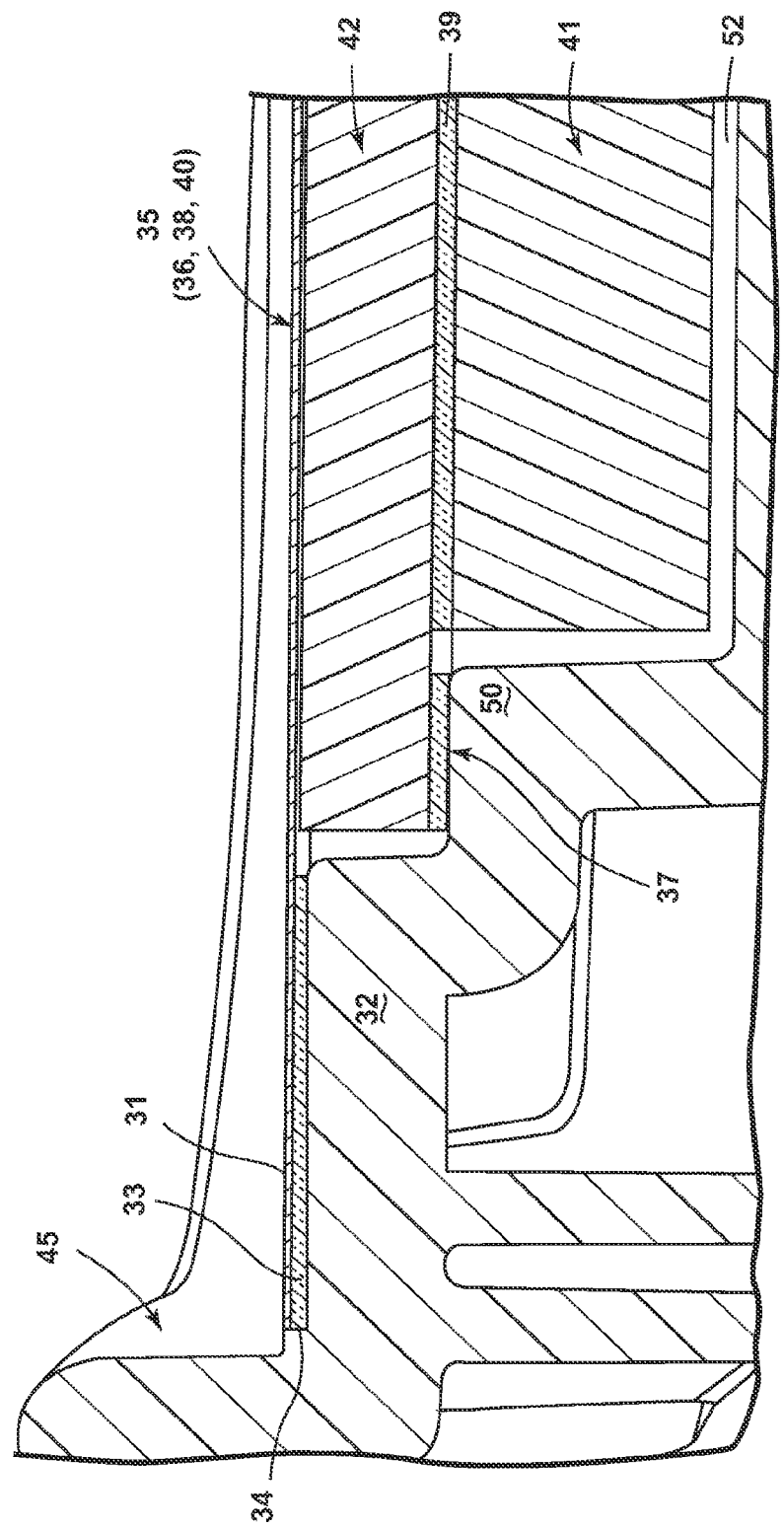
FIG. 6 is a fragmentary schematic side sectional view illustrative of the structure of the remote control of FIG. 3.

As seen in FIGS. 5 and 6, the touch sensing area provided by the touch sensing structure 35 is smaller than the top polyester layer 31 such that the touch sensing adhesive 30 (FIG. 7) is inside the water seal of the adhesive seal layer 33. It is important that the touch sensing adhesive 30 is not exposed to water, as otherwise spa water could eventually seep in between the touch layers 36, 40, causing failure of the touch sensing. By making the polyester layer 31 and its adhesive seal layer 33 larger and protective of the touch sensing adhesive 30, the touch sensing is rendered tolerant to the spa water environment. By using the top polyester layer 31 as both a water proofing layer, and the top of the touch sensing system, the sensitivity of the touch sensing function is greatly enhanced.

As further seen in FIGS. 5 and 6, the polycarbonate substrate layer 42 is smaller than the top polyester layer 31 to allow for perimeter sealing, but is larger than the LCD color display 41 below. The polycarbonate substrate layer 42 is used to provide mechanical support for the entire assembly, to provide rigid backing support for the touch sensing structure 35, to provide the surface on which the lower layer 40 of electrically conductive touch sensing material is applied, and to provide mechanical mounting for the LCD color screen 41. Although polycarbonate is the preferred material in one embodiment, other substrate materials may also be used, such as acrylic, glass, etc. Polycarbonate provides excellent optical clarity, rigidity, and tolerates dropping.

A second adhesive support layer 37 is bonded between the polycarbonate layer 42 and the tread of a second step 50 in the plastic housing 45 of the remote control body. This layer 37 is centered within the adhesive seal layer 33 and the first step 32 in the plastic housing 45.

The optically clear adhesive (OCA) layer 39 (FIG. 6) bonds the LCD 41 to the bottom side of the polycarbonate layer 42. This adhesive 39 covers the entire viewable area of the LCD 41 to eliminate air gaps and the possibility of condensation on the surface of the LCD 41 which would cause image distortions. Alternatively, an edge adhesive system could be employed, but will result in a small air gap and potential for condensation on the LCD screen surface. The LCD color display 41 is in turn bonded to the bottom of the assembly via another layer 52 of optically clear adhesive.

In the illustrative embodiment, in order for a spa remote control to be allowed to be positioned in its charging dock 24 either facing into or out of the spa 11, depending on where the user is accessing it, and to enable the spa remote 25 to float evenly in the water, all weight is centered horizontally, and is evenly distributed vertically so that the device will float consistently. To allow reliable charging in the spa environment, a wireless power transfer scheme is employed. To allow charging in either direction of placement in the dock 24, both the power transmit coil in the dock 24, and the power receive coil in the remote 25 are centered horizontally in each respective device. At the same time the rechargeable battery pack 53 is also placed in the center horizontally within the remote 25 so that its weight is centered.

Figure 8:
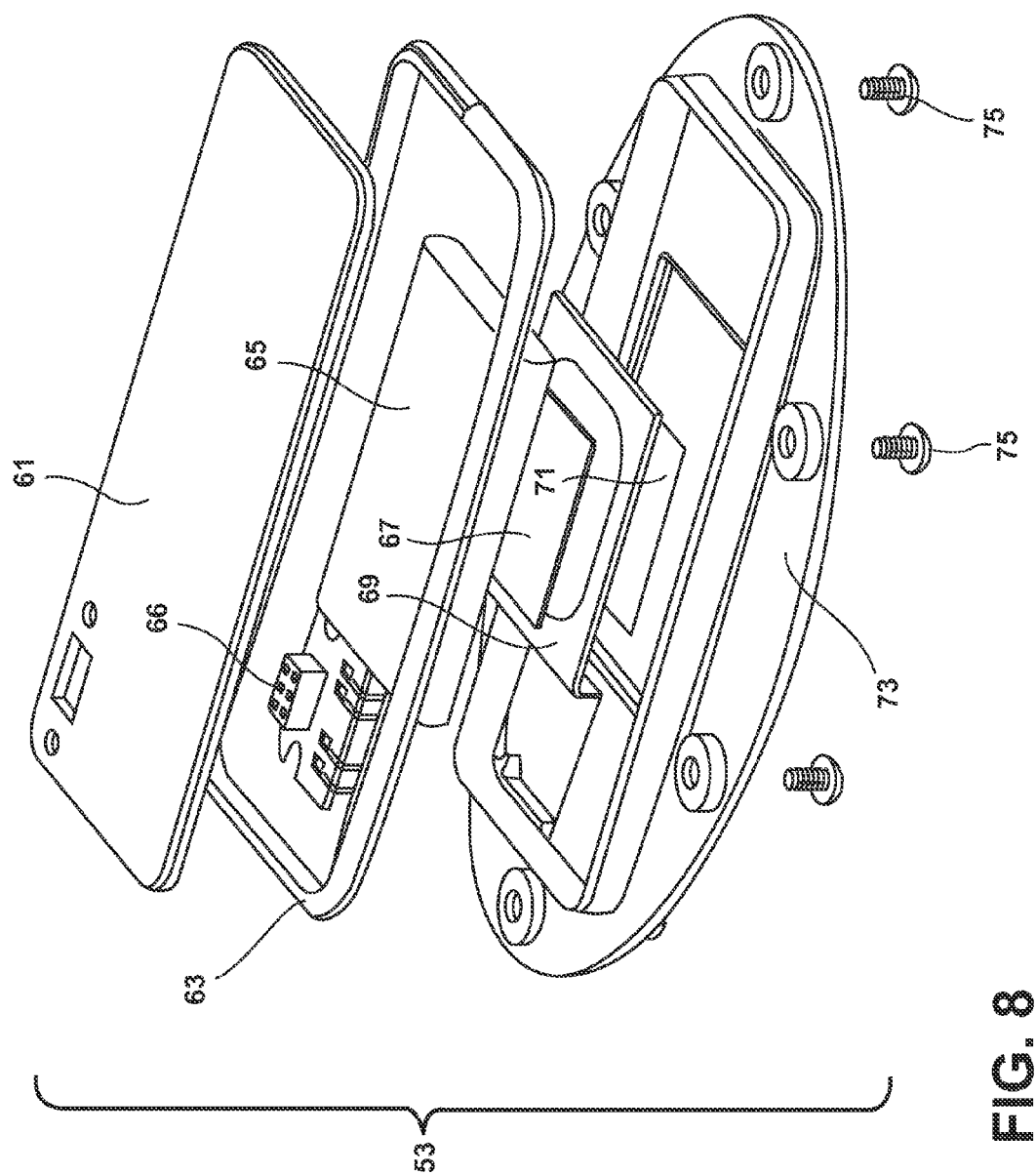
FIG. 8 is an exploded perspective view of the battery assembly of the remote control of FIG. 3.

As illustrated in FIG. 8, to allow for occasional battery replacement, the spa remote 25 employs a battery assembly (battery pack) 53 which contains a power receiving coil 69, a rechargeable battery 65, a female connector 68, and a temperature sensor located on the small PCB inside the battery pack. The temperature sensor is contained within the battery assembly 53 to allow for proper charge management of the battery 65. The battery assembly 53 has a perimeter water seal 63 such that all inner components of the assembly 53 are protected from water when installed in the spa remote 25. The power receiving coil 69 is placed on the bottom of the battery assembly 53 so that it can pick up magnetic fields from the dock power transmit coil and is also placed in the center of the pack for proper weight centering. The rechargeable battery 65 is also centered and placed directly on top of the power receiving coil 69, also for weight centering.

In an illustrative embodiment, the electrical interface via connector 66 to the primary electronics of the PCB assembly 49 within the spa remote 25 consists of two coil connections, two battery connections, and two temperature sense connections. The two temperature sense connections are also shared by two USB external programming data lines for software updates via the battery connector when the battery assembly 53 is removed.

In an illustrative embodiment, the remote 25 uses intelligent charging. Thus, when placed in the dock 24, power from the dock 24 is used to charge the battery 65 if charge is needed. When removed from the dock 24, the remote 25 runs on battery power and tracks usage times to establish typical patterns and anticipate how long the remote 25 is used away from the dock 24 to ensure proper charge.

While in battery mode (away from the dock), the remote's software counts the active time (not dozing or sleeping). When placed back in the dock 24, start of charge is determined by looking at the recent usage times and the battery voltage. A charge cycle will be started at a higher battery voltage/charge level if typical recent usage away from the dock 24 is longer, and the charge cycle will be started at a lower battery voltage/lower charge level if it is expected that the next usage will require less power/shorter usage.

The purpose of this charge algorithm is to extend the battery longevity by performing fewer charge cycles, while at the same time ensuring good run times out of the dock 24 based on usage history. The charge algorithm also limits the maximum charge voltage of the battery 65 to about 70%, which at typical spa environment temperatures will also extend battery longevity. Lithium-ion battery life is shortened if held at full charge at 100° F. temperature. It is also shortened if allowed to discharge too deeply and if always re-charged whenever placed in the charger. It is ideal to leave the battery 65 in the 30 to 70% charge range at moderate temperatures.

In one embodiment, the top and bottom halves 45, 51 of the remote's plastic housing are sealed around their perimeter using a primary and secondary seal system. The primary seal is the "gland" seal 47, where the seal is made horizontally by compressing a relatively soft gasket material between a vertical wall 56 (FIG. 5) protruding down from the top half 45 of the top housing 45 and a mating vertical wall 58 protruding up from the bottom half housing 51. By sealing horizontally between two rigid walls 56, 58, very little static pressure is needed in the vertical direction. Therefore, the fasteners (shown in the drawings?) that hold the top and bottom together require very little constant tension to maintain the seal, in comparison to a compression seal that relies on the constant tension.

The secondary seal is a soft gel material 60 embedded in a channel in the top housing 45. The top edge of the vertical wall 58 protruding up from the bottom housing protrudes into the gel 60 with slight compression and some displacement of gel 60 to create a secondary seal around the full perimeter of the mating parts 45, 51.

Figure 4:
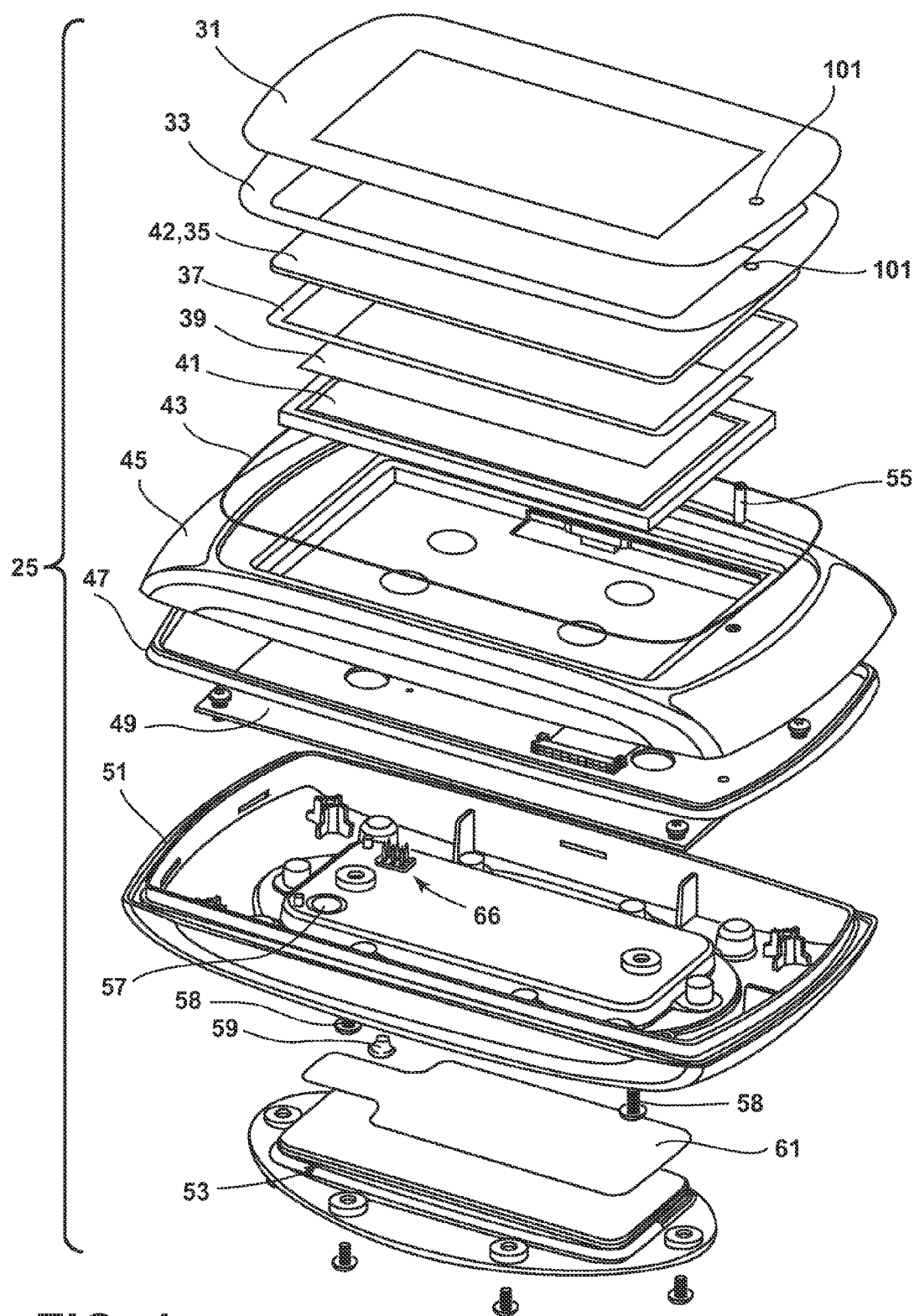
FIG. 4 is an exploded perspective view of the remote control of FIG. 3.

The top and bottom housings 45, 51 are held together with plastic snaps 64, 66 (FIG. 5) molded into the housings, as well as threaded screw fasteners 58 (FIG. 4). In one embodiment (FIG. 4), two screws 58 are inserted through the bottom housing 51 via the battery cavity and then thread into the bottom of the top housing 45. Either one or both types of fasteners can be utilized in various embodiments. The overall system provides the option of allowing the device to be opened for service and re-work if necessary, as opposed to seal systems that employ permanent adhesives.

Figure 9:
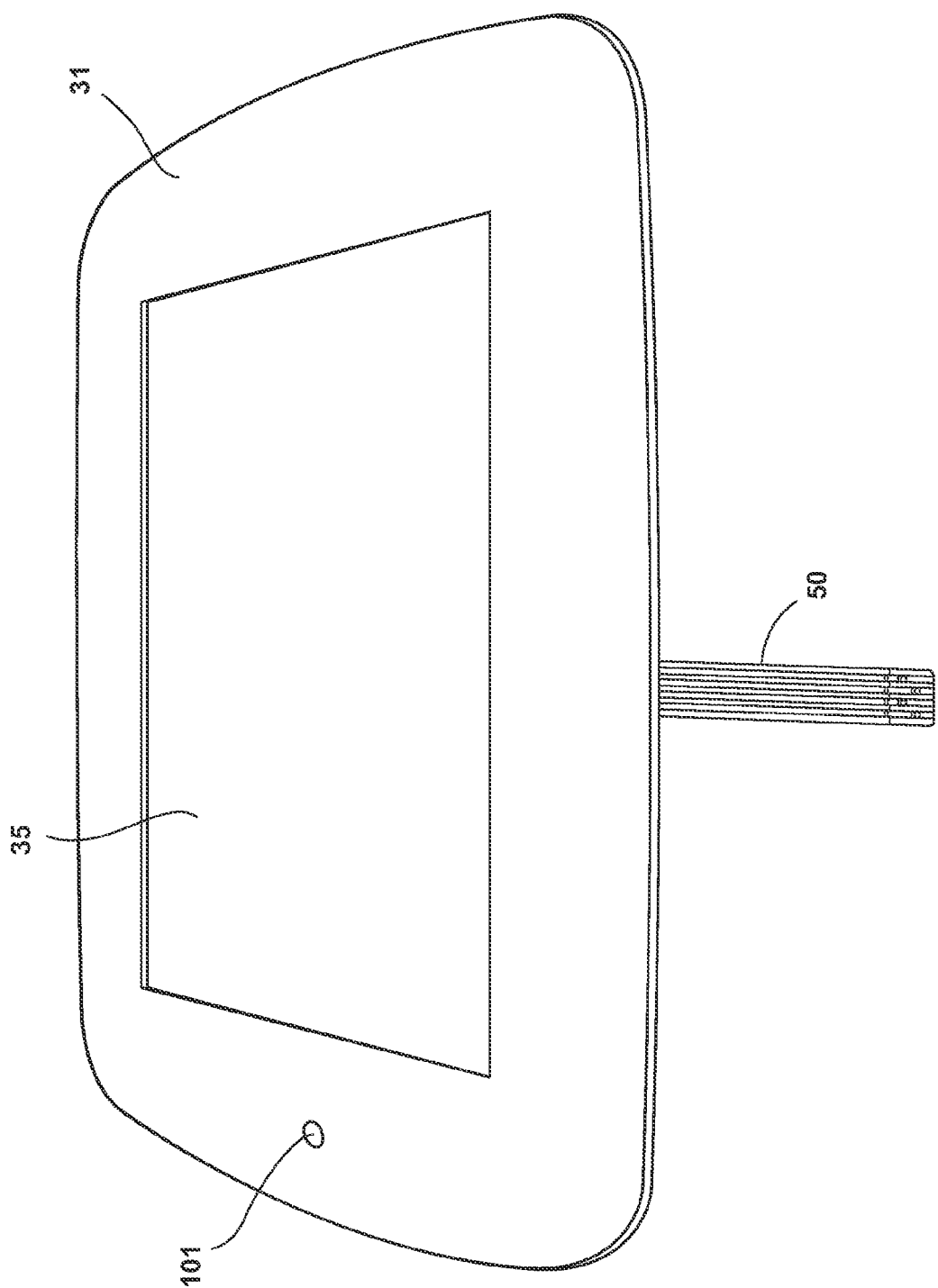
FIG. 9 is a top view further illustrative of the touch panel assembly of the remote control of FIG. 3.
Figure 10:
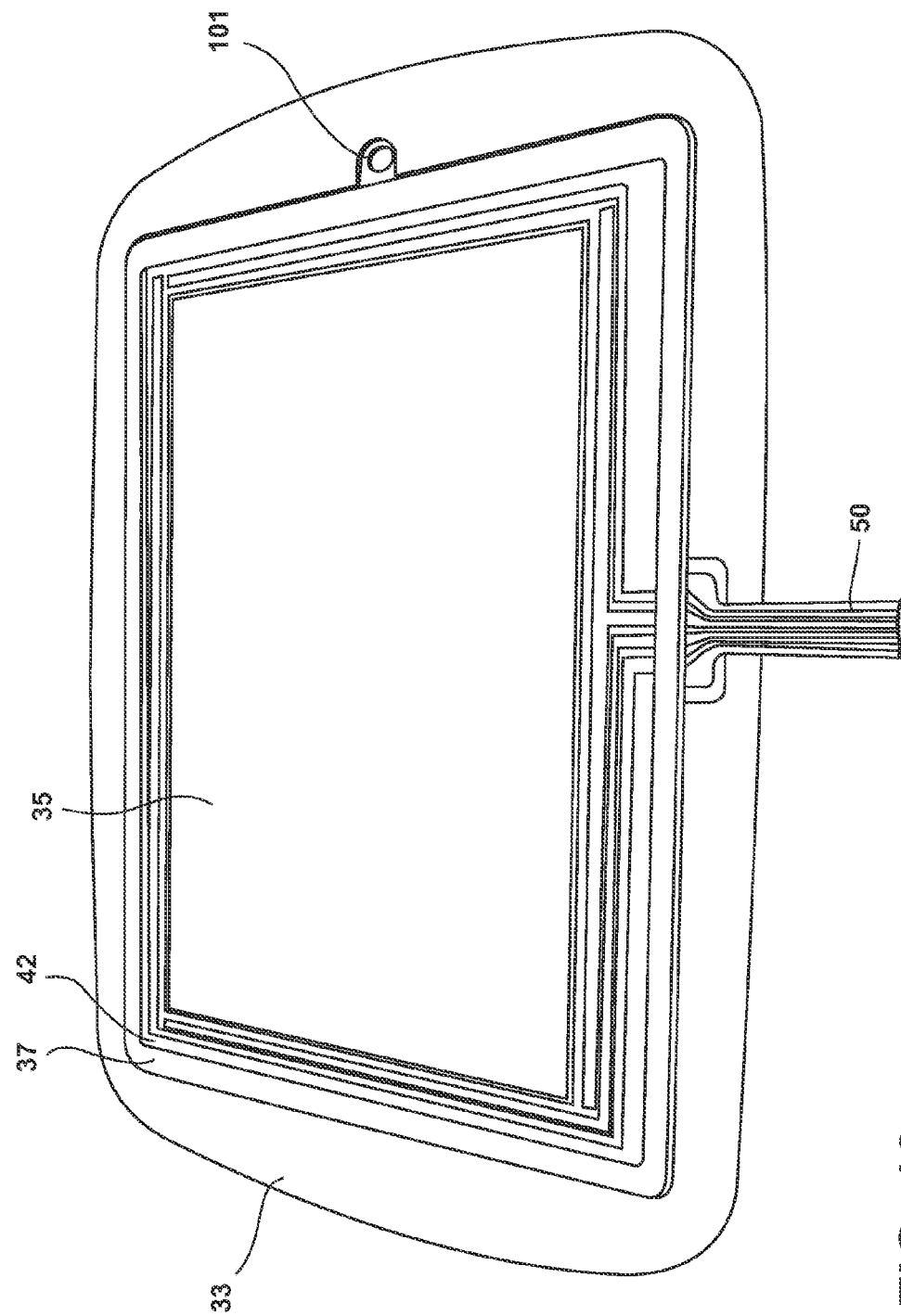
FIG. 10 is a bottom view of the touch panel assembly of FIG. 9.

According to one illustrative embodiment, the LCD 41 and touch panel are assembled to form a subassembly (FIGS. 9, 10) consisting of the following layers top to bottom: a) the polyester layer 31, whose rectangular dimension fits into the largest step 32 of the top housing nest, with perimeter adhesive tape 33 for later bonding to the housing 45; b) a touch screen structure 35 affixed to the rear of the polyester layer 31 and on top of the clear polycarbonate layer 42; c) the clear polycarbonate layer 42, whose rectangular dimension fits into the second step 50 in the top housing 45, with a second layer of adhesive tape 37 around its perimeter; d) clear optical bonding adhesive 39 adhered to the back of the polycarbonate layer 42 and to the top of the LCD module 41; and e) the LCD module 41, whose rectangular dimension fits within the smallest step 50 of the top housing nest.

When the LCD/touch panel subassembly just described is placed into the stepped nest of the top housing 45, the perimeter adhesive tape 33 attached to the polyester layer 31 forms a primary water proof seal, and the larger size of the polyester layer 31 prevents the touch screen structure 35 from being exposed to water, as noted above. The polycarbonate layer 42 is then attached to the second step 48 via the second layer of adhesive tape 37 for mechanical strength, providing mechanical support for both the polyester layer 31 and the LCD module 41. The LCD module 41 is bonded to the back of the polycarbonate layer 42 and does not rest on any of the top housing steps, so it is suspended from the rear of the polycarbonate layer 42, helping protect the LCD glass from breakage.

In assembly, the LCD/touchscreen sub-assembly (LCD display, polycarbonate layer touch screen, and top polyester layer) is first assembled into the stepped nested housing cavity and bonded to the top housing 45 via the adhesive tape layers 33, 37. The circuit board (PCB) assembly 49 is mounted on the topside of the bottom housing 51. In one embodiment, the circuit board assembly 49 is positioned by two pegs or bosses and is attached by screws at each of its four corners. A flexible electronic connector 50 (FIG. 5) passes through an opening in the stepped housing cavity and into the circuit board cavity and then attaches to the circuit board assembly 49.

The bottom housing 51 is attached by screws to the top housing 45. As noted above, a waterproof seal between the top and bottom covers is created by a main seal, which is a "gland seal," which seals by sideways pressure or squeezing, rather than by vertical pressure. A "Gore" vent 57 is also provided to eliminate pressure differentials, e.g. for altitude compensation.

As noted above, a battery 65 is installed in the rectangular battery housing 53, which is closed by a rectangular cover or "header" 61. The closed battery housing 53 then mounts into a rectangular receptacle formed in the underside of the lower housing 51. Location pins in the receptacle guide the positioning of the battery housing assembly 59 so that six vertical conductor pins 66 (FIG. 4) are guided through holes in the battery housing cover to properly connect with the battery 65 and inductive charge coil 69. The battery pack has its own gland seal 63 for waterproofing, and the battery 65 and coil 69 are centered to promote even floating.

In one embodiment, the top polyester layer 31 and the double sided adhesive tape layer 33 have concentric holes 101 (FIG. 4) formed therein, which conduct ambient light to the light pipe 55, which then conducts the light to a light sensing circuit on the PCB 49. The ambient light is used to automatically adjust the back light of the LCD 41 for user comfort and battery power savings.

In one embodiment, the remote control device 25 communicates wirelessly with spa-based control circuitry comprising a radio, e.g. by using an IEEE 802.15.4 or other suitable protocol. The remote control 25 communicates commands to/from the spa 11, causing various spa actions. The remote's electronics comprises a microprocessor, a graphics sub-system 227 (FIG. 14) to drive the LCD 41, a non-volatile graphics memory to store graphic images, a battery charge circuit controlled by the microprocessor software to restrict charging and extend battery life, and touch screen interface circuitry and software, all of which may be located on PCB 49 in one embodiment.

Figure 11:
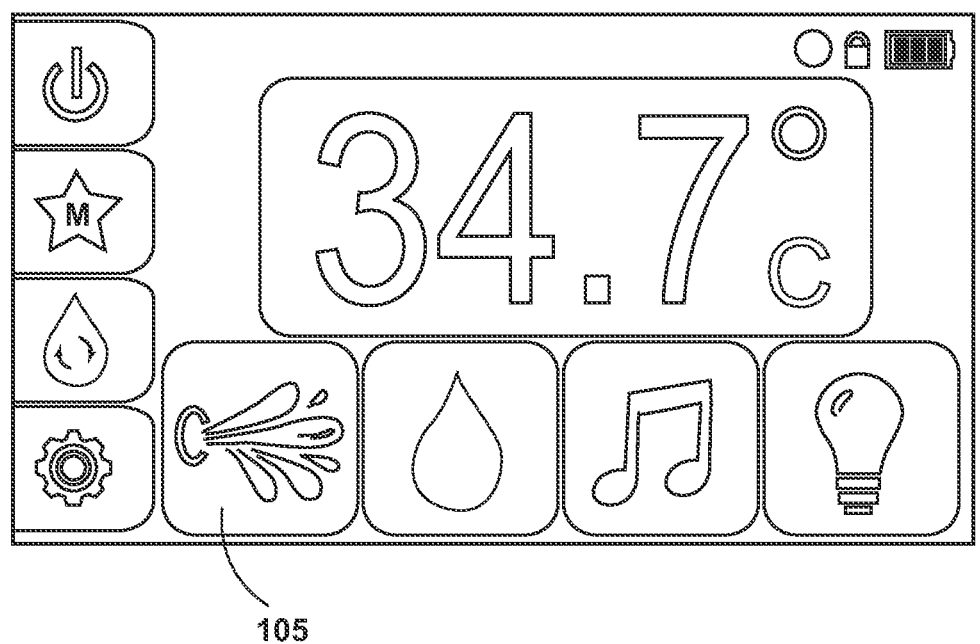
FIG. 11 is a front view of an illustrative graphical interface for the remote control of FIG. 3.

In an illustrative embodiment, the remote 25 employs a relatively large color LCD 41 with a full graphical user interface illustrated in FIG. 11 that works with the touch screen. This arrangement creates a very user friendly interface that is far less dependent on language and therefore makes the product more easily useable throughout the world. At the same time, the device electronics and processing power must be restrained in order to provide excellent battery life, lower cost to fit the market, and controls-grade reliability.

In one embodiment, the remote 25 is designed to be a slave device of the spa control 190, which allows software and user-interfaces to be easily upgraded via the spa control and does not require full-reprogramming of the remote 25 itself. In this embodiment, the actual graphic images reside in non-volatile memory in the remote 25. The spa control 190 then issues a series of commands to use these graphics to construct the screens on the remote 25. When the screen is touched, the position information is sent to the spa control 190 which has logic to direct new actions on the remote 25 as well as taking actions within the spa 11, as appropriate. For example, touching the JETS icon 105 (FIG. 11) sends its X-Y coordinates to the spa control 190, which, in turn, turns on the jet pumps, and sends commands to the remote 25 to draw the graphics for the JETS screen.

According to this illustrative embodiment, graphics must be moved from non-volatile memory to the graphics output memory for displaying them. The user-interface would suffer significantly if every image had to be loaded from non-volatile memory every time something changed because it would take multiple seconds for each action, making the user-interface unworkable.

At the same time, significant delays occur if the spa control 190 must issue multiple commands to create each screen as there may be many details involved. Due to power and reliability considerations, the speed of the radio link with wireless transmitter/receiver of the remote 25 is relatively slow and limits the update speeds, and is not conducive to full image transfers.

Figure 12:
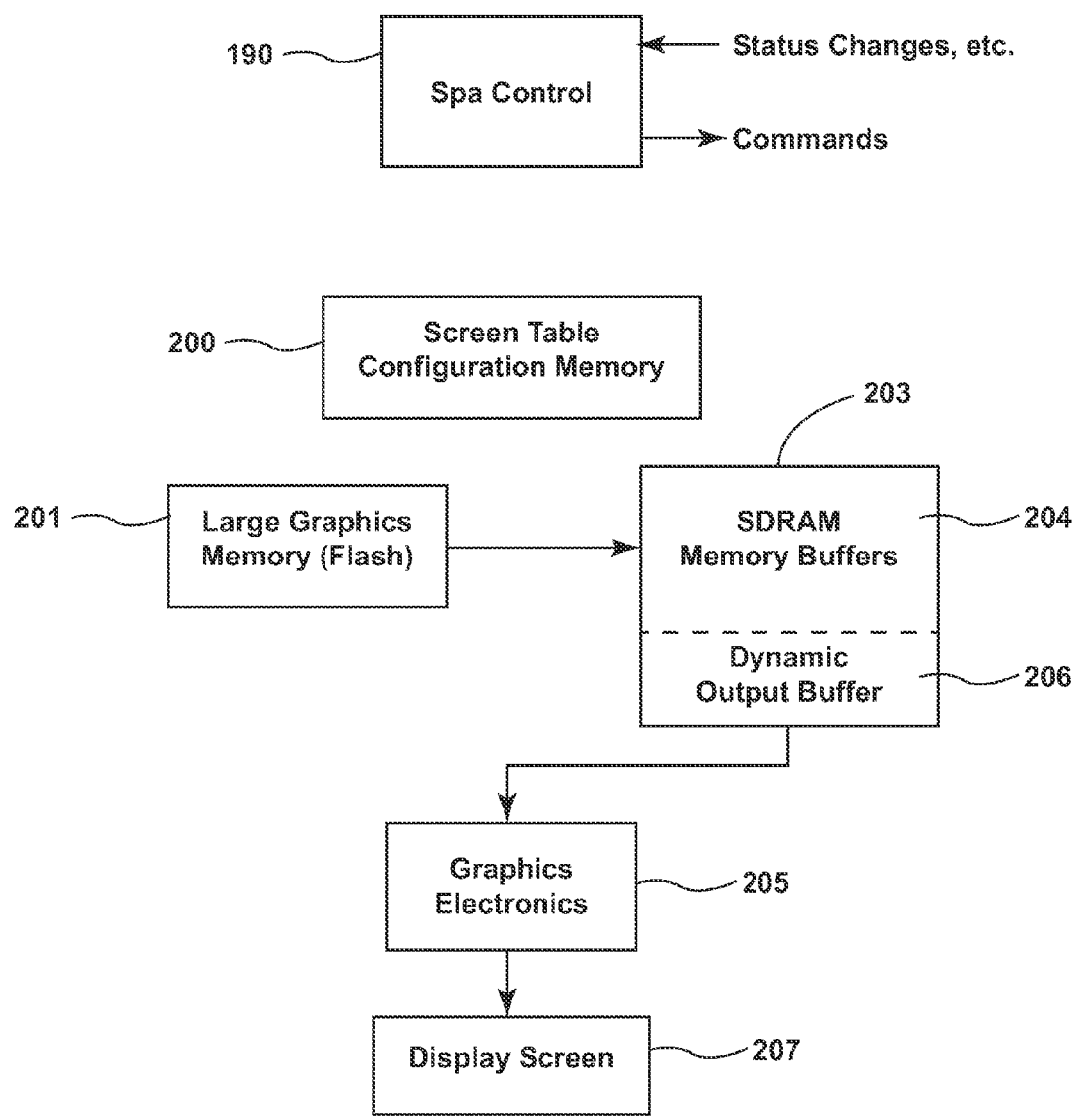
FIG. 12 is a schematic block diagram of a memory system of an illustrative remote control embodiment.

Accordingly, a memory system is constructed as part of a system which responds to spa control commands to create various displays. An illustrative embodiment of such a memory system is shown in FIG. 12 and includes a screen configuration table 200, a large graphics memory 201, and SDRAM 203 comprising memory buffers 204 and a dynamic output buffer 206. The SDRAM 203 communicates with graphics electronics 205, which causes display of desired images on the display screen 207.

The software employed in the remote system 12 takes steps to minimize delays and to create a very responsive dynamic user-interface. As noted, the remote 25 contains a screen configuration table memory 200. This memory 200 is initialized and updated by the spa control via a series of commands to create a screen. Once a screen has been created, the next time the remote 25 must display that screen, it draws the screen based on the contents of the configuration memory 200. The screen draw time is significantly shorter than a new screen construction, although the spa control can over-write this memory 200 at any time as required. The configuration memory 200 is non-volatile so that it is immediately available after a power cycle/battery change. The remote 25 also contains the large graphics memory 201 in non-volatile "flash" memory and the high speed "SDRAM" volatile memory 203 whose contents can be directly and immediately displayed by the graphic electronics 205.

Figure 13:
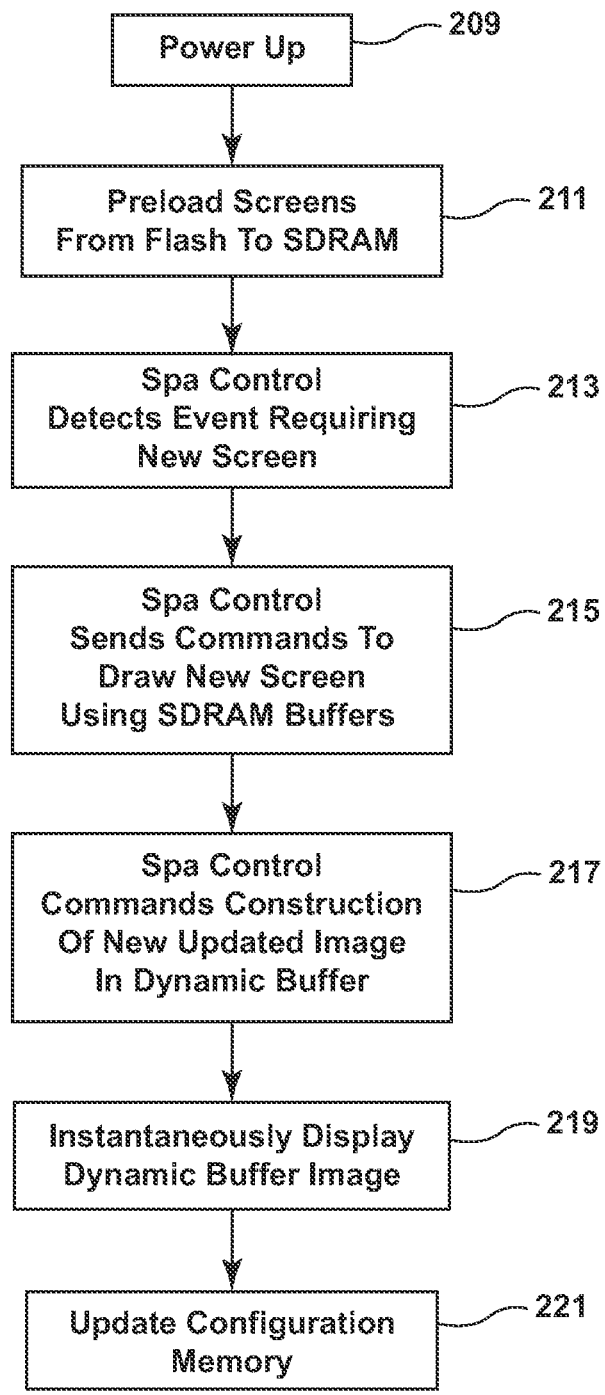
FIG. 13 is a flow diagram illustrating a method of display screen image generation according to an illustrative embodiment.

On power-up from battery insertion or placement into the dock, step 209 of FIG. 13, the remote 25 immediately starts pre-loading screens from the flash memory 201 into the SDRAM memory buffers 204 based on the configuration memory 200 (step 211). In the illustrative embodiment, the screens loaded are the ones most used. This preload can take up to 15 to 20 seconds. The graphics system also has a dynamic output screen buffer 206 in SDRAM 203.

When a new screen is to be drawn, the spa control 190 first instructs the remote 25 to display an image from one of the SDRAM memory buffers 204, if available, step 215. Then, the spa controller 190 sends commands to construct a completely up-to-date version of the same image, but with the current spa status (such as jet pumps being "on") in the dynamic buffer 206 (step 217). Once this new image is prepared, the graphic system is instructed to instantaneously switch the image from the SDRAM memory buffer 204 to the new image stored in the dynamic output buffer 206, step 219. To build and maintain the configuration memory 200, the command strings are updated to the non-volatile memory on each command if there is a change, step 221.

Figure 14:
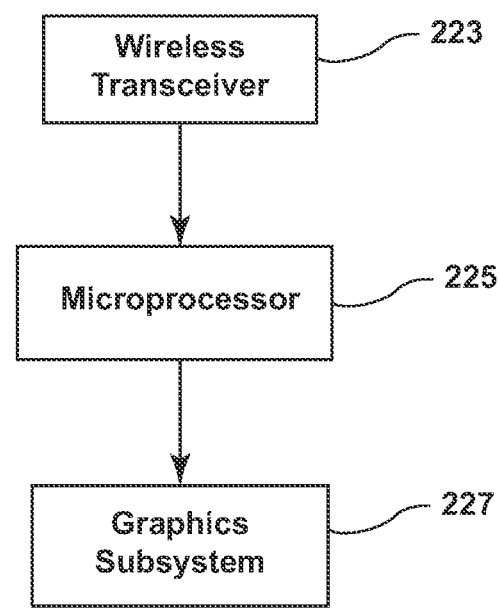
FIG. 14 is a block diagram illustrating one embodiment of hardware for use in implementing the method of FIG. 13.

In one embodiment, commands are transmitted wirelessly from the spa controller 190 to a wireless transceiver 223, and then to a microprocessor 225, as shown in FIG. 14. The microprocessor 225 then executes the various commands issued by the spa control 190 through appropriate control of the various memories and electronics illustrated in FIG. 12.

The SDRAM 203 requires power to retain the graphic images. While the remote 25 is in the dock charging station, power is supplied from the dock. However, if the remote 25 is removed from the dock, the battery 65 must supply all power. It is desirable that the remote 25 wake up immediately with no delays to load graphics, so the battery 65 must power the SDRAM 203 for expected periods of time when the remote is removed from the dock. At the same time, it is desirable to not over-discharge the battery 65.

Therefore, a power management scheme is implemented that enhances the user's graphical experience. Graphics images are loaded upon power up. Graphics images are retained in SDRAM 203 at all times when powered from the dock. Graphics images are retained on battery power if not in the dock at full power for short periods of time while the user is controlling the spa (several minutes per session). Graphics images are also retained under battery power in a "doze" mode for 1 to 2 days (expected) by turning off all electronics except the SDRAM 203 in an ultra-low power mode. After 1-2 days of maintaining the graphics on battery power, the SDRAM 203 is also shut off and the entire system goes into deep sleep in order to preserve some battery power and avoid "over-discharge". Re-power after deep sleep is identical to a cold power-up and all graphics images must be re-loaded, based on the configuration memory described above.

The design of the touch screen of the illustrative embodiment allows for normal operation and normal life in the harsh spa environment. Illustrative embodiments of the touch screen described herein may thus provide a highly sensitive touch screen that works in water, having a smooth front surface appearance, a bright intuitive display, and compatibility with the harsh spa environment. The touch screen sub-assembly of illustrative embodiments is also unique in that it allows full touch screen control of the spa 11 even while operating in the water, yet does not require a front bezel for water sealing, maintains excellent sensitivity to touch, and has a large full color screen.

Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A waterproof floatable remote control for a spa comprising:
    a top housing comprising a first upper step leading to a second lower step;
    a top polyester layer;
    a first adhesive layer located about the perimeter of an underside of the top polyester layer and attaching the top polyester layer to a tread portion of the first upper step;
    a clear polycarbonate layer having a sidewall lying adjacent a riser portion of the first upper step and having a rectangular top surface;
    a resistive touch screen structure comprising an upper conductive layer located on a backside of the top polyester layer and spaced apart from a lower conductive layer located on a top surface of the clear polycarbonate layer;
    a perimeter adhesive formed around a perimeter of the touch screen structure and bonding the backside of the top polyester layer to the top surface of the clear polycarbonate layer;
    a second adhesive layer fastening a bottom surface of the polycarbonate layer to a tread portion of the second lower step;
    an LCD module positioned adjacent a riser portion of the second lower step;
    a clear optical bonding adhesive adhering the back of the polycarbonate layer to the top of the LCD module;
    wherein the first adhesive layer on the underside of the top polyester layer forms a primary water proof seal and wherein the top polyester layer has a width greater than that of a width of the touch screen structure thereby preventing the touch screen structure from being exposed to water; and
    wherein the second layer of adhesive provides mechanical support for both the polyester layer and the LCD module.

2. The remote control of claim 1 further comprising:
    a bottom housing configured to mate with and attach to said top housing and having a receptacle therein;
    a battery assembly mounted in said receptacle and comprising:
    (a) a rectangular housing;
    (b) a rechargeable battery assembly comprising a battery mounted in said housing; and
    (c) a power receiving coil mounted in said housing beneath said battery assembly for charging said rechargeable battery;
    wherein the rectangular housing of the battery assembly comprises:
    a bottom part mating with a top part;
    a watertight gland seal between said bottom part and said receptacle; and
    wherein the battery assembly and the power receiving coil are centered within the bottom housing to promote even floating of the remote control.

3. The remote control of claim 1 further comprising a circuit board assembly mounted on a topside of the bottom housing.

4. The remote control of claim 3 wherein the circuit board assembly is positioned by two pegs or bosses and is attached by screws at each of four corners.

5. The remote control of claim 3 wherein a flexible electronic connector passes from the touch screen structure through an opening in a stepped housing cavity, then into a circuit board cavity, and then attaches to the circuit board assembly.

6. The remote control of claim 1 wherein the layers are concentric.

7. The remote control of claim 1 further configured to removably mount to a docking station fixedly located in a spa.

8. The remote control of claim 7 wherein said docking station comprises a communications interface to a central spa controller within the spa, a radio for communication with the remote, a wireless power transmitter, and a WiFi module for communication to nearby WiFi devices, such as a smart phone.

9. The remote control of claim 1 wherein a central cavity is defined by the riser portion of the second step.

10. The remote control of claim 2 wherein a gland seal is positioned between respective vertical walls of the top and bottom housings and a secondary seal is formed by a soft gel material embedded in a channel in the top housing into which protrudes the vertical wall of the bottom housing.

11. The remote control of claim 10 wherein the top and bottom housings are held together with first and second plastic snaps molded into the housings, as well as by threaded fasteners.

12. The remote control of claim 1 further comprising a graphics display system comprising a screen configuration table memory, a graphics memory, an SDRAM, and graphics electronics controlling image display on a display screen, the system being configured to:
    preload screens from the flash memory to SDRAM upon system power-up based on the screen configuration table memory;
    respond to a first command from a spa controller to draw a first new screen by sending image data from a memory buffer portion of SDRAM to the graphics electronics to cause display of the image represented by the image data;
    respond to commands from the spa controller to update the first new screen image by constructing a new update image in a dynamic buffer portion of SDRAM; and
    instantaneously cause display of the new image stored in the dynamic buffer to replace the image originally presented from the SDRAM memory buffer.

13. The remote control of claim 12 wherein the system is further configured to update the screen configuration table memory to reflect the new image being displayed.

14. The remote control of claim 12 wherein the screens which are preloaded during power-up comprise those screens which are most frequently used.

15. The remote control of claim 12 wherein the commands from the spa controller are received over a wireless link comprising a wireless transceiver located in said remote control.

16. The remote control of claim 12 wherein said graphics memory comprises flash memory.

* * * * *